United States Patent
Warbrick et al.

(10) Patent No.: US 6,694,098 B1
(45) Date of Patent: Feb. 17, 2004

(54) APPARATUS AND METHOD FOR READING DATA FROM AN OPTICAL PACKET HEADER

(75) Inventors: Kevin John Warbrick, Herts (GB); Martin J. Fice, Herts (GB); Jonathan King, Epping (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/459,546

(22) Filed: Dec. 13, 1999

(51) Int. Cl.$^7$ ................................................. H04J 14/00
(52) U.S. Cl. ............................. 398/54; 398/47; 398/51
(58) Field of Search ........................ 359/135, 139, 359/123; 370/392; 398/51, 54, 47; 375/268, 286, 289; 275/300

(56) References Cited

U.S. PATENT DOCUMENTS

| | | | |
|---|---|---|---|
| 5,739,933 A | * 4/1998 | Dembeck et al. | 359/117 |
| 5,956,165 A | * 9/1999 | Fee et al. | 359/118 |
| 6,222,654 B1 | * 4/2001 | Frigo | 359/119 |
| 6,271,946 B1 | * 8/2001 | Chang et al. | 359/124 |
| 6,272,548 B1 | * 8/2001 | Cotter et al. | 709/238 |
| 6,341,031 B1 | * 1/2002 | McBrien et al. | 359/237 |
| 6,370,290 B1 | * 4/2002 | Ball et al. | 385/14 |

OTHER PUBLICATIONS

J. Spring, "Photonic Header Replacement for Packet Switching", Electronics Letters, vol. 29, No. 17, IEE, 1993.*
H. Chao, "A Photonic ATM Front–End Processor", Lasers and Electro–Optics Society 1998 Annual Meeting Conference Proceedings, IEEE, 1–4 Dec. 1998.*
J. Fan et al., "Preamplifier ASK System Performance with Incomplete ASK Modulation: Influence of ASE and LAser Phase Noise", Journal of Lightwave TEchnology, vol. 13, No. 2, IEEE, 1995.*

* cited by examiner

*Primary Examiner*—Leslie Pascal
*Assistant Examiner*—Shi K. Li

(57) ABSTRACT

A method of reading and updating a packet header of an optical packet for transmission over an optical network involves dividing the input signal into two paths. The signal in one path (46) is converted into an electrical signal and the header information is read. The data stored in the packet header is removed optically in the other path (44) by constraining the packet header signal to have a constant amplitude. Updated header information is used to modify the constant amplitude signal using a modulator (60). An apparatus is provided for implementing the method. The header is thus read in the electrical domain, but it is updated optically.

15 Claims, 2 Drawing Sheets

APPARATUS AND METHOD FOR READING DATA FROM AN OPTICAL PACKET HEADER

FIELD OF THE INVENTION

This invention relates to the field of optical signal processing, and in particular to the processing of packet-based optical signals and to the reading and updating of the packet headers of such signals.

BACKGROUND OF THE INVENTION

The advantages of packet-based optical transmission systems are well known, and the SONET standard is widely accepted as a suitable physical layer for optical transmission systems. Indeed, SONET is one of the many physical layers defined for ATM, which is itself a cell-based (i.e. packet-based) switching and multiplexing technology.

The rapid increase in transmission rates achieved by optical transmission systems far exceeds the capability of electronic processing of signals. Consequently, the limitation to data transfer rates results principally from delays introduced by electrical switching elements. However, these electronic and opto-electronic elements are required for performing switching and routing functions, and the conversion of high-speed optical data to electrical signals for the switching and routing operations is recognised as causing a data transfer restriction.

There have been proposals which provide all-optical networks in which switching and routing take place in the optical domain. One proposal involves the use of time-shift keying, but the fine tolerances in timing and delay compensation present serious difficulties.

An alternative proposal described in U.S. Pat. No. 5,541,756 is to provide a packet header with wavelength-coded data, with a grating operating as a wavelength differentiator. Different wavelength signals within the optical header may then be deflected by differing amounts for detection by photo-electric sensors positioned at different locations. A problem with the use of multiple wavelengths within a single optical packet is that the different signals must be spaced by guard bands to take account of the different amounts of optical dispersion of the different wavelength signals.

According to a first aspect of the present invention, there is provided an apparatus for reading data from a packet header of an optical packet for transmission over an optical network, and for writing data to the packet header, data stored in the packet header being encoded using amplitude modulation, the apparatus comprising:
- a divider for dividing an incoming optical signal into a first and a second path;
- a converter in the second path for converting at least the packet header into an electrical signal;
- header reading circuitry;
- header updating circuitry;
- an erasing unit in the first path for removing the data stored in the packet header by constraining the packet header signal to have a constant amplitude; and
- a modulator provided in the first path for modifying the constant amplitude signal using updated header information from the header updating circuitry.

The reading apparatus of the invention only needs to convert the packet header into an electrical signal, in the second path, whereas entire optical packet remains in the optical domain in the first path. The header is thus read in the electrical domain, but it is updated optically. Rewriting of the optical header does not seek to replace the optical carrier, so that there are no issues of carrier superposition.

Preferably, therefore, the carrier wavelength of the packet header and of the payload of the optical packet are the same.

The use of amplitude modulation in the packet header enables amplitude detection using conventional commodity electro-optics.

The amplitude modulation of the data in the header may provide a first maximum amplitude representing a first value and a second amplitude representing a second value, the second amplitude being substantially greater than the minimum value but less than the maximum value. This modulation technique enables data carried by the header to be unwritten without destroying the underlying carrier, for example by reducing the amplitude of the packet header signal to the second amplitude. The use of low modulation depth amplitude modulation in this way gives rise to an additional optical loss introduced by unwriting the optical header, but this represents only a fractional increase in the optical span loss. For example, the first amplitude and the second amplitude may differ by 10% (a 0.5 dB loss) compared to the optical span loss of 23–30 dB. In other words, the unwriting of the optical header still leaves a substantial optical carrier which can be re-modulated with new header information.

Instead of reducing the amplitude of the header data to the second amplitude, the erasing unit may comprise a booster for increasing the amplitude of the packet header signal to the first amplitude, thereby overwriting the packet header information. The modulator may then modulate the booster signal to include updated header information. This arrangement enables the increase in optical loss to be avoided, but of course requires an active optical component.

The booster is preferable gated, so that the boosting operation is controlled to coincide only with the packet header signal, and not with the packet payload signal.

The updated header information may be fed to the second path either in the electrical or the optical domain.

The data may be stored in the payload of the optical packet at a higher rate than in the header. A lower rate header signal enables commodity electro-optics to be used, giving cost advantages through using volume products. The electronics may not respond to the signal in the payload of the optical packet. However, all synchronisation and framing data will be contained within the header signal, so that no information needs to be derived from the optical payload to enable reading of the header information.

The apparatus for reading data may comprise a packet routing apparatus having a plurality of outputs, and which routes an input packet to one or more of the plurality of output depending on the header data read by the header reading circuitry. For example, the apparatus may comprise an optical ATM switch.

The invention also provides a method of reading and updating a packet header of an optical packet for transmission over an optical network, comprising:
- dividing an incoming optical signal into a first and a second path;
- converting the signal in the second path into an electrical signal and reading the header information;
- providing updated header information;
- optically removing the data stored in the packet header in the first path by constraining the packet header signal to have a constant amplitude;

modifying the constant amplitude signal using the updated header information.

According to a second aspect of the invention there is provided a frame structure for an optical packet for transmission over an optical network, comprising a packet header and a packet payload, wherein data is stored in the packet payload at a higher rate than in the packet header, and wherein the data in the header is encoded using amplitude modulation.

Preferably, low modulation depth amplitude modulation is employed, and the carrier wavelengths for the header and the payload are the same.

BRIEF DESCRIPTION OF THE DRAWINGS

Examples of the present invention will now be described in detail with reference to the accompanying drawings in which.

DETAILED DESCRIPTION

Figure 1:
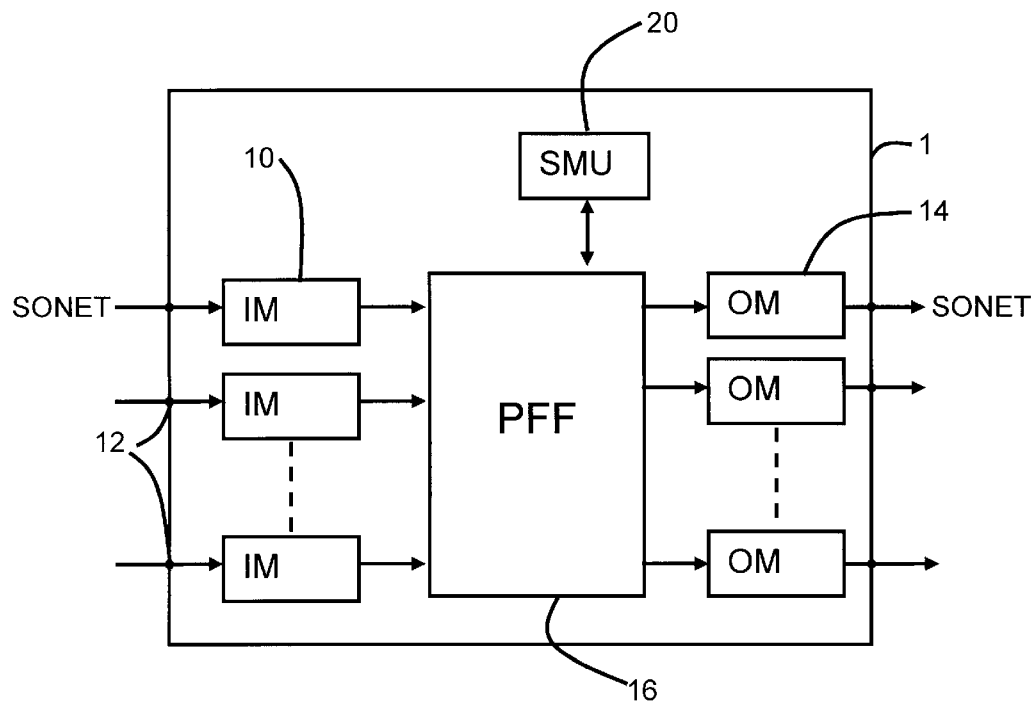
FIG. 1 shows schematically the basic operation of a packet label switch.

This invention relates to the encoding of data to form an optical packet, and to an apparatus for reading the header or label of that packet and for updating the packet header information. The invention therefore relates to the physical layer of an optical packet network. This physical layer may be used to implement any desired packet switching mechanism and furthermore, as will be apparent from the following, it does not provide any constraints on the nature or encoding of the payload data within the optical packets. The packet reading and writing system may therefore be used to implement an optical packet based switching network, for example a label based switched network.

For the purposes of explanation, the operation of a conventional label switch operating in an optical network will be explained with reference to FIG. 1.

The fundamental operation of the switching system is to route packets according to information in the label of the packet. As will be known by those skilled in the art, the label contains all the information necessary to assign an output port for the packet. The information within the packet payloads is carried transparently by the label switched network, and the label switch processes only the labels. At the output ports of the switching system, the packets are prepared for the selected physical layer.

Packets are first received by input modules 10 at the input ports 12 of the switch 1. As one example, the physical layer may be the SONET standardised format, as shown in FIG. 1. The function of the input modules 10 is to convert the optical signals at the inputs 12 into electrical signals and to extract the packet payload information from that electrical signal, i.e. from the SONET frames.

Output modules 14 perform the reverse functions of the input modules 10, and their main responsibility is to prepare packets for physical transmission over the particular physical layer system used within the network, for example SONET. Changes may also be implemented to the label information, for example to indicate that a particular optical packet has passed through a specific node. For example, the time to line (TTL) counter will be decremented in the label.

The packet forwarding fabric 16 is responsible for transferring packets between the input and output modules. There are numerous additional functions of the packet forwarding fabric, as will be apparent to those skilled in the art, but the primary function is for the switching of packets between the input and output modules. Further functions of the packet switch will not be described in detail, although a system management unit 20 is shown schematically in FIG. 1.

The conversion to the electrical domain by the input modules 10 is the most significant contributing factor to the overall delay of the switch 1.

Figure 2:
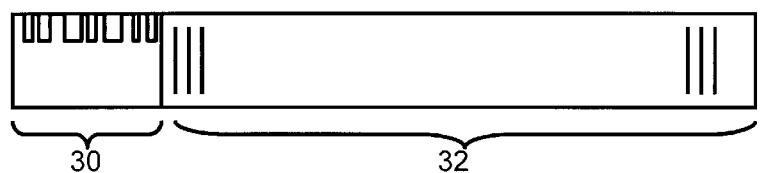
FIG. 2 shows the packet format in accordance with the invention.

FIG. 2 illustrates a packet structure for use over the physical layer in accordance with the invention. This packet structure may be used to implement a packet switched network, although it may also implement any other switching configuration.

The packet includes a label 30 and a packet payload 32. Data in the label 30 is encoded using amplitude modulation. The term "amplitude modulation" as used in this description and claims is intended to cover both amplitude and intensity modulation, which both enable the modulating signal to be derived from the amplitude of the modulated carrier.

In one preferred frame format shown in FIG. 2 low modulation depth is used in the header or label 30. In other words, the header signals have either a first maximum amplitude representing a first value or else a second amplitude representing a second value, the second value being substantially greater than the minimum but being less than the maximum. For example, the encoding of ones and zeros in the header 30 may result in signals of either maximum amplitude or of 90% amplitude. The manner in which the payload data 32 is encoded is of no consequence, and accordingly numerous physical layer configurations may benefit from an optical packet header structure of the invention.

The data rate within the payload 32 will depend upon the services being provided by the optical network. However, it is envisaged that the data rate within the payload 32 is significantly greater than in the header 30. In particular, the data rate within the header is intended to be sufficiently low that after opto-electronic conversion the header information can be read by off-the-shelf electronic circuitry. It is also preferred that the payload 32 and header 30 are encoded by suitable modulation of an optical carrier signal having the same carrier wavelength. This minimises dispersion effects during transmission of the optical packet. The individual bits encoded into the header 30 may be represented as return-to-zero pulses, for example solitons, with the peak amplitude modulated by the low depth amplitude modulation.

Figure 3:
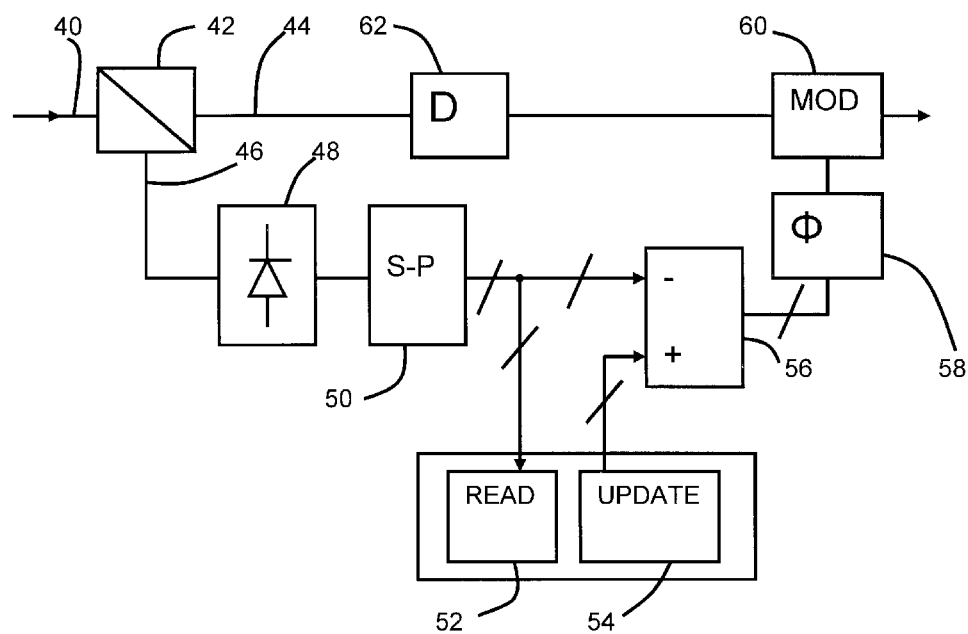
FIG. 3 shows a first example of apparatus for reading data from the header or label of the packet shown in FIG. 2 and for updating the header information.

FIG. 3 shows a first example of an apparatus for reading data from the packet header illustrated in FIG. 2, and for updating the packet header information.

The input signal 40 arrives through a waveguide, such as a fibre-optic cable and appropriate optics (not shown). An optical beam divider or beam splitter 42 is provided in the path of the signal 40 to produce two paths. A first path 44 remains in the optical domain, whereas a second path 46 is provided for enabling conversion of the header into the electrical domain. The beam splitter 42 may cleave the signal unevenly such that the signal in the second path 46 is a low intensity signal, and the signal 44 in the first path is a high intensity signal. For example, 5% of the intensity of the incident signal 40 may be divided and passed to the second path 46.

The signal in the second path is supplied to a convertor 48 for converting the optical signal into an electrical signal. The frequency response of the convertor 48 may be such that detection of the payload 32 is not possible, and only the lower bit rate header 30 may be converted. In any case, the header 30 includes appropriate bit sequences to enable the timing of the header to be determined from data stored within the header itself. The header data is converted into parallel format by a serial to parallel convertor 50 and the electrical header data is then read by header reading circuitry 52.

The header reading circuitry 52 may perform the functions of the input module 10 shown in FIG. 1, and accordingly may derive the ATM switching information from the header if the invention is being used in an ATM switching network. Irrespective of the particular switching characteristics of the network, the header reading unit 52 will derive information from the header enabling control of switching units to provide the desired routing of the optical packets.

As described above, it may be desirable to update the header to indicate that the packet has passed through a particular switching unit. For this purpose, header updating circuitry 54 is provided which generates modified data for the header. In the circuit shown in FIG. 3, the header data is updated using a negative feedforward loop, with the updated header information being provided to an amplifier 56 within the loop. This amplifier 56 combines the original header information with the update signal to generate the required modified header data.

This modified header data is translated back into the optical domain by a modulator 60 which receives as control signal the output of a phasing unit 58. The modulator 60 may comprise a lithium niobate Mach-Zehnder interferometer modulator, which may be implemented as a diffused strip waveguide.

Alternatively, the modulator 60 may be an electroabsorption modulator, which has two operating states each providing different attenuation, the states being selected by an input control signal.

The modulator 60 in fact performs two functions. The first is to erase the data stored in the packet header by constraining the packet header signal to have a constant amplitude. This constant amplitude signal then forms the carrier for the updated header information. These two functions of the modulator may be carried out by a single modulator 60 with the control signal applied to it giving rise to the combined reduction in signal amplitude arising from the erasing function and the re-modulation function. Alternatively, separate units may be provided, initially for constraining the amplitude to the lower value, and then modulating this signal.

As explained with reference to FIG. 2, the lower amplitude may only be 10% below the higher amplitude. This means that the header reading and writing operation may be performed a number of times along the path of an optical packet before regeneration is required.

The updating of the header information must be timed very accurately with the arrival of the optical signal along the first path 44. For this purpose, a delay element 62 is introduced between the splitter 42 and the modulator 60. One contributor to this required delay is in the serial to parallel conversion of the header data which then enables interpretation of that data. The phasing unit 58 is also provided to ensure correct timing of the modulator control signal with the header or label to be processed by it, and enables fine tuning of the timing, to enable matching of the delay in the straight through arm 44 with the delay in the modulator drive chain.

As explained above, the reading apparatus of FIG. 3 gives rise to an amplitude reduction in the optical header 30. There is also a loss of intensity as a result of the splitter 42.

Where the erasing unit is provided as a separate component, it may comprise an optical limiter, for example an attenuator in the form of a non-linear optical loop mirror. This device will also limit the payload data as well as the header data. Consequently, the number of times header data can be read and written is limited using the arrangement of FIG. 3.

Figure 4:
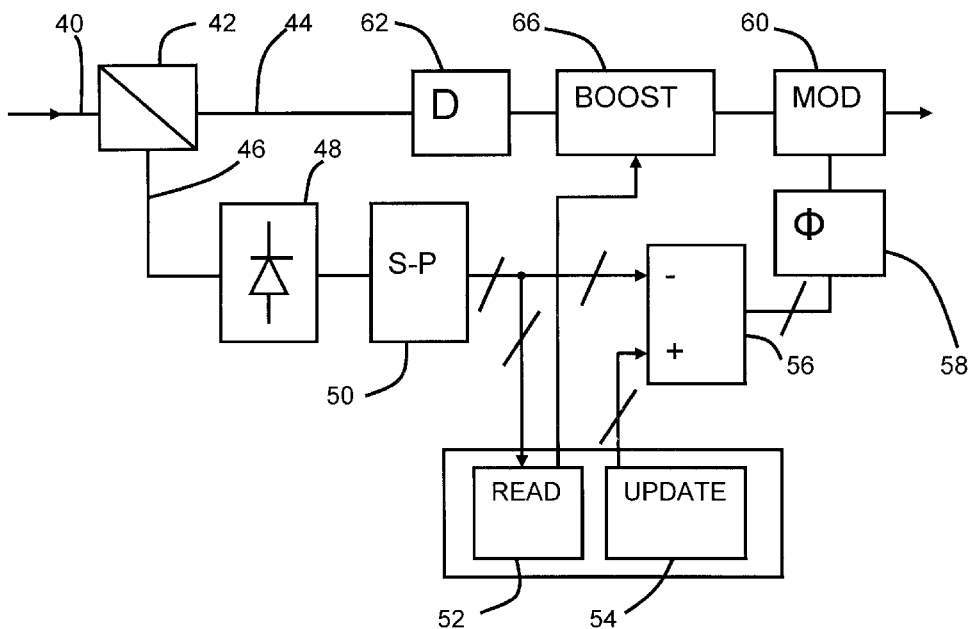
FIG. 4 shows a second example of header reading and writing apparatus.

FIG. 4 shows an alternative arrangement in which a boosting unit 66 is provided before the modulator 60. The remaining components in FIG. 4 are identical to those in FIG. 3. The boosting unit 66 is designed to increase all of the pulses in the optical header to the maximum value. The operation of the boosting unit 66 needs to be deactivated during the passage of the payload data. For this purpose, the boosting unit 66 is gated using a control signal supplied by the header reading circuitry 52. The boosting unit 66 is controlled to be transparent after having erased the header information and during passage of the payload information. The header information for the next transit of the optical packet is then modulated onto the boosted carrier at the modulator 60. This arrangement provides full payload data transparency and minimises the accumulated reduction in signal level of the header resulting from multiple erase/re-write cycles as in the embodiment of FIG. 3.

The boosting unit 66 may comprise a fast semiconductor amplifier, having fast saturation characteristics. These fast saturation characteristics are required so that the gain of the amplifier can fluctuate sufficiently rapidly to amplify adjacent pulses of different amplitude to the constant boosted level. The use of the booster 66 may enable a reduction in the number of regenerators required across the transmission span of the optical packet signal. To enable the boosting unit 66 to distinguish between header data and payload data, a guard band is preferably provided between these parts of the frame to take account of the switching time of the boosting unit.

Although FIGS. 3 and 4 show the header updating circuitry 54 operating in the electrical domain, and supplying a parallel electrical signal to the amplifier 56 for combination with the detected header information, the updating circuitry 54 may operate in the optical domain. For example, the updated optical header information could be combined optically with the current header before conversion by the detector 48. A subtraction unit in the electrical domain would then subtract the updated header information from the read signal to derive the original header signal to be provided to the header reading circuitry 52. The updated header information would be used to control the modulator.

There are various ways in which amplitude modulation may be achieved, and the various possible designs of the modulator 60 will be apparent to those skilled in the art. Similarly, the timing of the control signals to the modulator 60 are critical, and must be provided to coincide with the arrival of the corresponding erased pulse of the original header. The circuit will therefore require a clock recovery system as well as the precise delay element 62, and clock extraction techniques will also be well known to those skilled in the art.

What is claimed is:

1. An apparatus for reading data from a packet header of an optical packet for transmission over an optical network, and for writing data to the packet header, data stored in the packet header being encoded using amplitude modulation, the apparatus comprising:

a divider for dividing an incoming optical signal into a first and a second path;

a converter in the second path for converting at least the packet header into an electrical signal;

header reading circuitry;

header updating circuitry;

an erasing unit in the first path for removing the data stored in the packet header by constraining the packet header signal to he a constant non-zero amplitude; and a modulator provided in the first path for modifying the constant amplitude signal using updated header information from the header updating circuitry.

2. An apparatus as claimed in claim 1, wherein the data in the header is encoded using amplitude modulation, with a first maximum amplitude representing a first value and a second amplitude representing a second value, the second amplitude being substantially greater than a minimum value but less than the maximum value.

3. An apparatus as claimed in claim 2, wherein the erasing unit reduces the amplitude of the packet header signal to the second amplitude.

4. An apparatus as claimed in claim 2, wherein the erasing unit comprises a booster for increasing the amplitude of the packet header signal to the first amplitude, thereby overwriting the packet header information, and the modulator modulates the boosted signal to include the updated header information.

5. An apparatus as claimed in claim 4, wherein the booster is gated, so that the boosting operation is controlled to coincide only with the packet header signal.

6. An apparatus as claimed in claim 1, wherein the modulator comprises an electro-absorption modulator.

7. An apparatus as claimed in claim 1, wherein the modulator comprises a lithium niobate modulator.

8. An apparatus as claimed in claim 1, wherein the header generating circuitry operates in the electrical domain.

9. An apparatus as claimed in claim 1, wherein the converter comprises a light sensor arrangement.

10. An apparatus as claimed in claim 1, wherein the optical packet comprises the packet header and a packet payload, and wherein data is stored in the packet payload at a higher rate than in the packet header.

11. An apparatus as claimed in claim 1, wherein the optical packet comprises the packet header and a packet payload, and wherein the carrier wavelength of the header and the payload is the same.

12. An apparatus as claimed in claim 1, wherein the erasing unit and the modulator comprise a single modulating unit which combines the functions of the erasing unit and the modulator.

13. An apparatus as claimed in claim 1, comprising a packet routing apparatus having a plurality of outputs, and which routes an input packet to one or more of the plurality of outputs, depending on the header data read by the header reading circuitry.

14. An apparatus as claimed in claim 13 comprising an ATM switch.

15. A method of reading and updating a packet header of an optical packet for transmission aver an optical network, comprising:

dividing an incoming optical signal into a first and a second path;

converting the signal in the second path into an electrical signal and reading the header information;

providing updated header information;

optically removing the data stored in the packet header in the fist path by constraining the packet header signal to have a constant non-zero amplitude;

modifying the constant amplitude signal using the updated header information.

* * * * *